United States Patent [19]

Colburn

[11] 4,249,296
[45] Feb. 10, 1981

[54] OIL FILTER REMOVING TOOL AND METHOD

[75] Inventor: Michael R. Colburn, Hayward, Calif.

[73] Assignee: Larry Telles, San Lorenzo, Calif. ; a part interest

[21] Appl. No.: 936,528

[22] Filed: Aug. 24, 1978

[51] Int. Cl.³ .............................................. B23P 19/02
[52] U.S. Cl. ..................................... 29/426.1; 81/64
[58] Field of Search ................... 81/64, 3.43; 29/426.1

[56] References Cited

U.S. PATENT DOCUMENTS

| | | | |
|---|---|---|---|
| 649,259 | 5/1900 | Powell et al. | 81/64 |
| 1,404,349 | 1/1922 | Despres | 81/3.43 |
| 1,495,195 | 5/1924 | Nay | 81/64 |
| 1,542,167 | 6/1925 | Ostheimer et al. | 81/64 |
| 2,009,765 | 7/1935 | Davis | 81/3.1 |
| 2,187,399 | 1/1940 | Hopkins | 81/64 |
| 2,389,301 | 11/1945 | Escher | 81/3.43 |
| 2,623,427 | 12/1952 | Ornstein | 81/64 |
| 2,995,965 | 8/1961 | Hockney | 81/64 |
| 3,051,179 | 8/1962 | Dwyer | 81/3.43 |
| 3,728,916 | 4/1973 | Brantley | 81/64 |
| 3,962,936 | 6/1976 | Lewis | 81/64 |
| 4,079,642 | 3/1978 | Scott | 81/64 |

Primary Examiner—James L. Jones, Jr.
Attorney, Agent, or Firm—Manfred M. Warren; Robert B. Chickering; Glen R. Grunewald

[57] ABSTRACT

A new method and tool for removing the conventional spin-on oil filter cartridge which typically is threaded onto the engine block of an internal combustion engine in proximity to other engine parts and which comprises the wrapping of the cartridge or canister with one end portion of a length of flexible material with the balance of the length coming off of the canister tangentially in the direction of unthreading the canister from the motor block; cinching of the end portion around the canister; extending the opposite end of the length tangentially away from the canister to a remote position spaced from the engine block and parts; and manually pulling on the free outer end of the length tangentially of the canister to tension the length and to apply a rotating torque to the canister and unthreading it from the motor block. The tool comprises a length of flexible material dimensioned for the purposes outlined above and cinch means for applying compressive force and rotational torque to the cartridge upon tensioning of the length.

1 Claim, 4 Drawing Figures

OIL FILTER REMOVING TOOL AND METHOD

BACKGROUND OF THE INVENTION

1. Field of Invention.

The invention relates to tools and techniques employed for removing spin-on oil filters from the engine blocks of internal combustion engines.

The removal of a spin-on type oil filter cartridge from the engine block of an internal combustion engine as required for routine servicing and change of lubricating oil, is frequently fraught with considerable difficulty, bruised hands, skinned knuckles and painful burning of the mechanic's hands and arms when the latter are inadvertently brought into contact with hot engine parts. Special wrenches have been designed to facilitate removal of the filters but the maze of parts typically crowded into the engine compartment interferes with the use of such wrenches and, in many instances, makes such use totally impractical. Accordingly, such spin-on filter cartridges are commonly removed by pounding a large chisel, screwdriver or the like through the oil filter canister, spreading rags around the area to contain the oil which will spill, and with the chisel or screwdriver in place striking it with a hammer or mallet to unthread the filter.

2. Description of Prior Art.

Typical of prior art tools and techniques for removing spin-on oil filter cartridges are U.S. Pat. Nos. 3,728,916 and 3,962,936. The tool disclosed in both of these patents comprises the combination of a strap bight adapted to fit around a filter cartridge and a wrench with the structure so arranged with rotation of the wrench tightens the bight around the cartridge and at the same time turns it in either wrenching direction. The wrench consists of a torquing lever which of necessity must move in close proximity to the cartridge and, accordingly, in close proximity to the engine block, head, manifolds and other parts. Typically, the area around the filter cartridge is crowded and relatively inaccessible making it awkward, if not impossible, to swing a torquing lever through any substantial distance.

SUMMARY OF THE INVENTION

The present device and method enables the user to quickly and easily remove a spin-on type oil filter cartridge by merely mounting a portion of the tool around the cartridge, threading a flexible length of material through open spaces in the maze of parts in the engine compartment for remote manual engagement and which functions to unthread the cartridge by the simple expedient of pulling on the remote end of the length of material, thus enabling the user to stand well away from the cartridge and out of proximity to the engine block, head, manifolds and other parts to affect removal of the filter cartridge with complete comfort and safety to the user.

Another feature of the present invention is to provide a tool and technique of the character above which can be readily used from either above or from below the engine compartment.

A further object of the present invention is to provide a tool of the character described which is inexpensive to manufacture and may be used with substantially all makes and models of cars, trucks, boats, motorcycles, etc.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
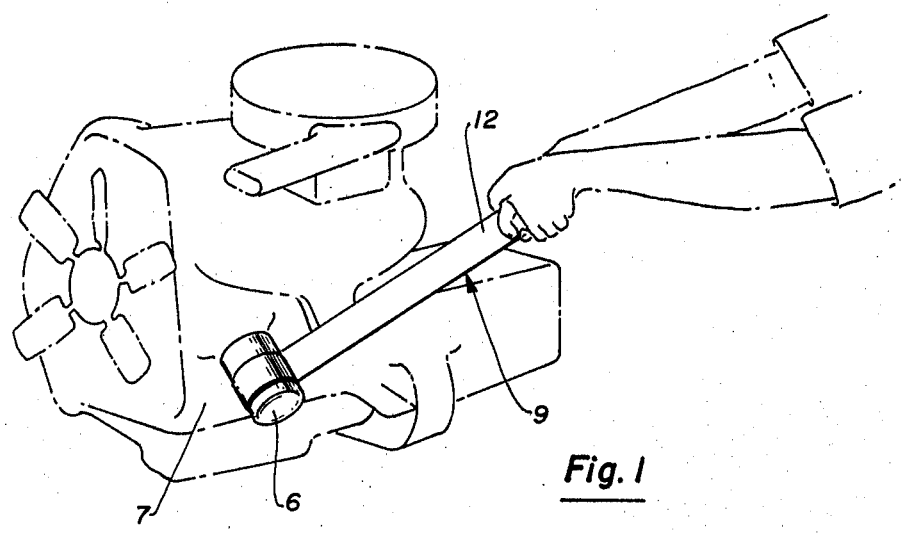
FIG. 1 is a perspective view of the oil filter removing tool and technique of the present invention.
Figure 2:
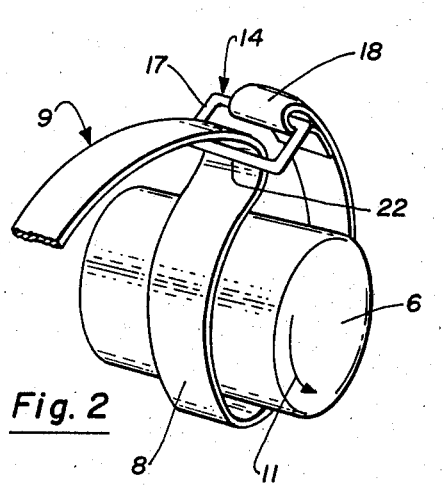
FIGS. 2 and 3 are perspective views showing the application of the tool to the filter cartridge.
Figure 3:
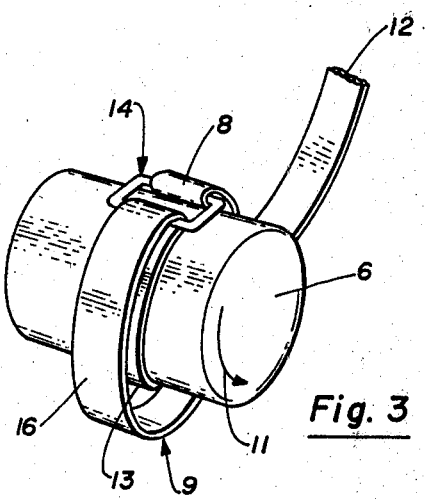

The method of the present invention for removing an oil filter canister 6 threaded on an engine block 7, typically in proximity to other engine parts, comprises briefly the steps of wrapping the canister with an end portion 8 of a length 9 of flexible material with the length coming off of the canister tangentially in the direction of unthreading, see arrows 11 in FIGS. 2 and 3, of the canister from the motor block; cinching of end portion 8 around the canister, see FIGS. 2 and 3; extending the opposite end 12 of the length 9 tangentially away from the canister to a remote position spaced from the engine block and parts; and manually pulling on the outer end 12 of the length tangentially of the canister, as depicted in FIG. 1, to tension the length and to apply a rotating torque to the canister and unthread it from the motor block.

In effecting the foregoing, the user will first wrap end portion 8 around the canister to complete a first turn 13, see FIG. 3; effect a slip connection 14 between opposed ends of turn 13 and tighten the turn on the canister; and then reverse the direction of wrapping of the adjacent free portion 16 of the length to overlap the turn in a reverse direction, see FIG. 3, whereby subsequent tensioning of the length will cause compression of the overlapped turn portions against each other and the canister.

Figure 4:
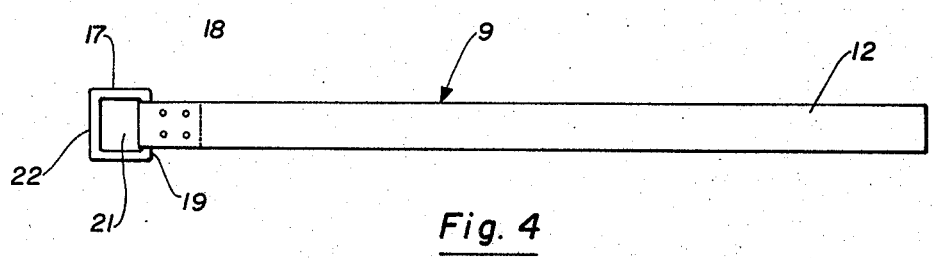
FIG. 4 is a front elevation of the tool.

The tool of the present invention, accordingly, comprises briefly the length 9 of flexible material dimensioned for wrapping of one end portion 8 around the cartridge and to extend tangentially therefrom to dispose the opposite outer end 12 of the length remote from the canister, block 7 and other motor parts. The length of material has a width for convenient manual engagement, as depicted in FIG. 1, for tensioning of the length and unwinding of the filter cartridge 6. The slip connection 14 is here provided by a cinch means which may be simply composed of an open buckle frame 17 having one end portion 18 riveted or otherwise secured to one side 19 of the frame, see FIGS. 2 and 4, the open portion 21 of the frame being dimensioned for threading therethrough of the strap-like member 9 for bearing against the opposite side 22 of the frame to cinch the first turn 13 around the canister and to apply a compressive force and rotational torque thereto upon tensioning of the strap member as depicted in FIG. 1.

One of the principal features in the present invention is that strap member 9 may be readily made of an ample length to wrap around the filter cartridge as above described and permit threading through the typical maze of engine parts in the engine compartment to position the outer end 12 well away from the engine and its parts so that the user can conveniently and safely stand well away from the engine compartment and apply the required pull to the strap member to effect unthreading of the filter. While in almost all instances, it is most convenient to extend the strap member up into clear space for manual engagement, the tool and method of the present invention may, with equal facility, be operated from below the engine compartment where such positioning is more convenient.

What is claimed is:

1. The method of removing a cylindrical oil filter canister threadably attached to an engine block in proximity to other engine parts using an elongated flat belt-like member having a closed loop slip connector providing a continuously variable sized loop adjacent a first end of said member, said member having a length at least several times the circumference of the canister so as to dispose the opposite end of said member remote from said canister and engine parts with said loop surrounding said canister, comprising the following steps:

adjusting the size of said loop to fit around said canister with said member in said loop extending from said slip connector in a wrapping direction opposite to the unthreading direction of said canister from said block and providing a first turn around said canister;

reversing the direction of wrapping of said opposite end of said member to overlap said turn in said reverse direction to provide overlapped turn portions and at least a substantially one-half second turn coming off said canister tangentially thereto in a reverse direction coinciding with the direction of unthreading of said canister from said block;

manually engaging said member remote from said canister and tensioning said member to compress said overlapped turn portions against each other and said canister and to apply rotational torque to said canister in said last-named direction.

* * * * *